United States Patent
Saleem et al.

(10) Patent No.: US 11,896,950 B1
(45) Date of Patent: Feb. 13, 2024

(54) ACTIVATED CARBON COMPOSITE FLAKES USING OLIVE STONE-POLYETHYLENE WASTE

(71) Applicant: KING FAISAL UNIVERSITY, Al-Ahsa (SA)

(72) Inventors: Junaid Saleem, Ar-Rayyan (QA); Sk Safdar Hossain, Al-Ahsa (SA); Zubair Khalid Baig Moghal, Ar-Rayyan (QA); Gordon McKay, Ar-Rayyan (QA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/378,297

(22) Filed: Oct. 10, 2023

(51) Int. Cl.
| | | |
|---|---|---|
| *B01J 20/20* | (2006.01) | |
| *C08K 3/04* | (2006.01) | |
| *B01J 20/26* | (2006.01) | |
| *B01J 20/30* | (2006.01) | |
| *C02F 1/28* | (2023.01) | |
| *C02F 101/30* | (2006.01) | |

(52) U.S. Cl.
CPC .......... *B01J 20/20* (2013.01); *B01J 20/261* (2013.01); *B01J 20/3078* (2013.01); *B01J 20/3085* (2013.01); *C02F 1/283* (2013.01); *C08K 3/04* (2013.01); *B01J 2220/46* (2013.01); *C02F 2101/308* (2013.01)

(58) Field of Classification Search
None
See application file for complete search history.

(56) References Cited

U.S. PATENT DOCUMENTS

| | | | | |
|---|---|---|---|---|
| 4,965,294 | A * | 10/1990 | Ohngemach | G03F 7/031 522/79 |
| 6,472,343 | B1 * | 10/2002 | McCrae | B01J 20/3289 502/402 |
| 2005/0211945 | A1 * | 9/2005 | Coppens | D06M 15/277 252/8.57 |
| 2006/0121389 | A1 * | 6/2006 | Anzures | G03F 7/2018 430/273.1 |
| 2020/0316560 | A1 | 10/2020 | Distefano et al. | |
| 2021/0070617 | A1 * | 3/2021 | Yamamoto | B01J 20/28057 |
| 2022/0410119 | A1 * | 12/2022 | Tsukazaki | B01J 20/28066 |

FOREIGN PATENT DOCUMENTS

WO 2020053619 A1 3/2020

OTHER PUBLICATIONS

Al-Ghouti, et al. "Optimizing textile dye removal by activated carbon prepared from olive stones." Environmental Technology & Innovation 16 (2019): 100488.

(Continued)

*Primary Examiner* — Chester T Barry
(74) *Attorney, Agent, or Firm* — Nath, Goldberg & Meyer; Richard C. Litman

(57) ABSTRACT

A method of preparing an adsorbent can include pyrolyzing olive stone to provide an olive stone char, activating the olive stone char, dissolving a polymer in an organic solvent to obtain a solution, dispersing the activated olive stone char in the solution to provide a mixture, extracting the solvent from the mixture to provide a composite, and annealing the composite to provide the adsorbent. The adsorbent can be porous.

17 Claims, 1 Drawing Sheet

(56) References Cited

OTHER PUBLICATIONS

Djahed, et al. "A novel and inexpensive method for producing activated carbon from waste polyethylene terephthalate bottles and using it to remove methylene blue dye from aqueous solution." Desalination and Water Treatment 57.21 (2016): 9871-9880.

Saleem, et al. "Production and applications of activated carbons as adsorbents from olive stones." Biomass Conversion and Biorefinery 9 (2019): 775-802.

* cited by examiner

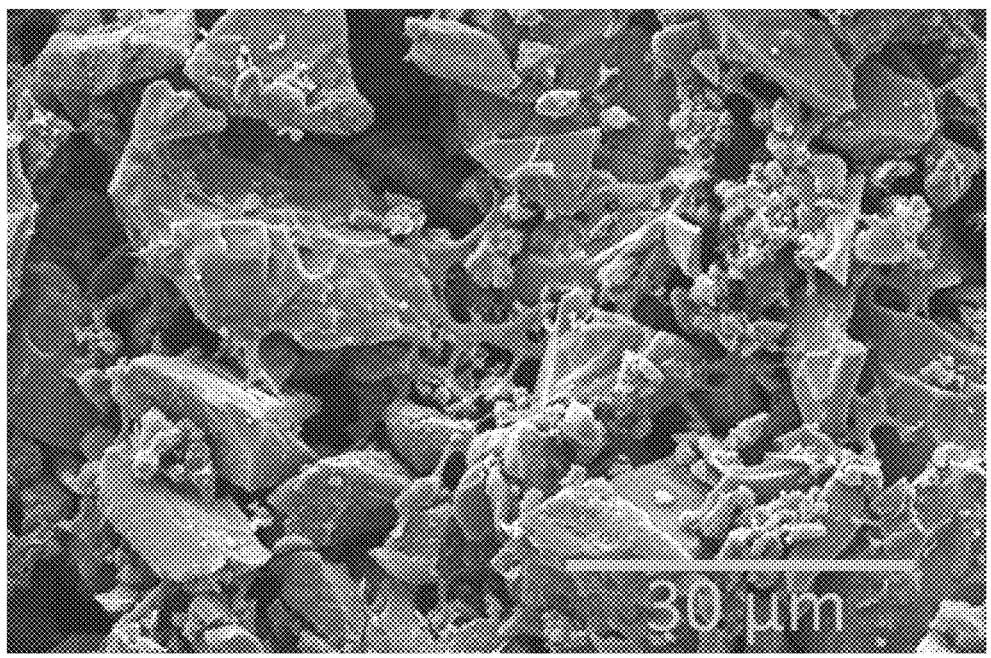

ACTIVATED CARBON COMPOSITE FLAKES USING OLIVE STONE-POLYETHYLENE WASTE

BACKGROUND

1. Field

The present disclosure provides a method for preparing activated carbon composite flakes, and particularly, to activated carbon composite flakes made using olive stone-polyethylene waste.

2. Description of the Related Art

Organic dyes that are disposed in natural waters may cause health side effects for human and/or aquatic life. Dyes, when discharged into receiving streams, will generally cause detrimental effects on the liver, gill, kidney, intestine, gonads, and pituitary gonadotrophic cells of aquatic life. In humans, they may cause irritation to the respiratory tract if inhaled, and irritation to the gastrointestinal tract if ingested. Contact of dyes with skin and eyes may cause irritation with redness and even permanent injury.

Other common organic wastewater pollutants include pharmaceuticals and personal care products, such as antibiotics (e.g., ciprofloxacin, levofloxacin, sulfamethoxazole) often found in surface waters and veterinary pharmaceuticals that enter the water via manure dispersion and animal excretion onto soils. Antibiotics in natural waters contribute to the spread of antibiotic resistance in microorganisms.

Since most organic dyes have high water solubility, they are generally difficult to remove by usual waste-treatment systems. Further, conventional adsorbents for dye and metal ion removal, such as activated carbon powder, require a filtration membrane and technique to separate the filtrate and the adsorbent.

Thus, an efficient, rapid, cost-effective, and environmentally friendly method for preparing an adsorbent for removal of pollutants from aqueous media is needed.

SUMMARY

The present subject matter relates to a method of preparing porous, activated carbon adsorbent flakes with a high surface area. The adsorbent flakes can be used for enhanced removal of pollutants from wastewater.

In one embodiment, the method of preparing an adsorbent can include obtaining olive stones; cutting and drying the olive stones to obtain dried olive stone pieces; alkali-activating the dried olive stone pieces to obtain alkali-activated olive stone pieces; pyrolyzing the alkali-activated olive stone pieces to obtain alkali-activated olive stone char; acid-activating the alkali-activated olive stone char to obtain acid-activated olive stone char; dissolving at least one polymer in an organic solvent to obtain a polymer solution; dispersing the acid-activated olive stone char in the polymer solution to obtain a mixture; extracting the organic solvent from the mixture to obtain a composite; and annealing the composite to provide the adsorbent.

In an embodiment, the adsorbent can be cut into small pieces to provide adsorbent flakes. The adsorbent flakes can have sufficient strength and a large surface area. In an embodiment, the at least one polymer includes polyethylene, such as polyethylene waste from recycled polyethylene, one-time disposed of polyethylene, or recovered from a waste polyethylene material derived from post-consumer/industrial waste.

In another embodiment, the present subject matter is directed to a method of removing a pollutant from an aqueous solution comprising contacting the aqueous solution with the activated carbon adsorbent flakes. In an embodiment, the aqueous solution can include wastewater. In an embodiment, the pollutant can include an organic dye.

These and other features of the present subject matter will become readily apparent upon further review of the following specification.

BRIEF DESCRIPTION OF DRAWINGS

The sole FIGURE is an SEM image of the olive stone-based polyethylene adsorbent.

DETAILED DESCRIPTION OF THE PREFERRED EMBODIMENTS

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps. It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present subject matter relates to a method of preparing activated carbon adsorbent flakes with a high surface area. The adsorbent flakes can be used for enhanced removal of pollutants from wastewater.

In one embodiment, the method of preparing an adsorbent can include obtaining olive stones; cutting and drying the olive stones to obtain dried olive stone pieces; alkali-activating the dried olive stone pieces to obtain alkali-activated olive stone pieces; pyrolyzing the alkali-activated olive stone pieces to obtain alkali-activated olive stone char; acid-activating the alkali-activated olive stone char to obtain acid-activated olive stone char; dissolving at least one polymer in an organic solvent to obtain a polymer solution; dispersing the acid-activated olive stone char in the polymer solution to obtain a mixture; extracting the organic solvent from the mixture to obtain a composite; and annealing the composite to provide the adsorbent.

In an embodiment, the adsorbent can be cut into small pieces to provide adsorbent flakes. The adsorbent flakes can have sufficient strength and a large surface area. In an embodiment, the at least one polymer includes polyethylene, such as polyethylene waste from recycled polyethylene, one-time disposed of polyethylene, or recovered from a waste polyethylene material derived from post-consumer/industrial waste.

In an embodiment, the porous activated carbon adsorbent flakes can be contacted with an aqueous solution to remove a pollutant therefrom. In one embodiment, the aqueous solution can be a wastewater stream. In another embodiment, the pollutant is an organic dye, such as Congo red, methyl blue, methylene blue, malachite green, Rhodamine B, bromophenol blue, rose Bengal dyes, Alizarin red, and Indigo carmine. In a particular embodiment, the organic dye includes at least one of Rhodamine B, Alizarin red, and Indigo carmine.

In an embodiment, the organic solvent that can be used to dissolve the polymer can be selected from the group consisting of p-xylene, o-xylene, m-xylene, an isomeric mixture of xylene, p-cymene, o-cymene, m-cymene, limonene, toluene, mesitylene, other aromatic hydrocarbons, and mixtures thereof. In certain embodiments, the organic solvent can be p-xylene.

In an embodiment, the method can include obtaining the olive stones and washing the olive pits with water to remove any pulp impurities. The washed olive stones can then be cut into small pieces and dried by any suitable means. In an embodiment, the cut olive stone pieces can be dried by exposure to sunlight, for example, for about two days. In an alternative embodiment, the cut olive stone pieces can be dried in a hot air oven at temperatures ranging from about 100° C. to about 120° C., or at a temperature of about 110° C., for a period of time ranging from about 1 hour to about 2 hours. In an embodiment, drying about 1 kg of olive stones can yield an amount of dried olive stones ranging from about 800 grams to about 900 grams of dried olive stone pieces.

The dried olive stone pieces can be alkali-activated by immersing the dried olives stone pieces in a solution including 2N KOH and stirring overnight, or for about 12 hours to about 24 hours. Then, the alkali-activated olive stone pieces can be removed from the solution by filtering, neutralizing with water, and drying. This step can yield about 800 grams to about 900 grams of alkali-activated dried olive stone pieces.

The alkali-activated olive stone pieces can be pyrolyzed by placing the alkali-activated olive stone pieces in a furnace programmed to achieve a temperature of about 500° C. to about 700° C. at a rate of about 10° C./minute. In an embodiment, the alkali-activated olive stone pieces can be pyrolyzed at a temperature of about 600° C. with a residence time of about 3 hours. The pyrolyzed alkali-activated olive stone pieces or alkali-activated olive stone char can be cooled to room temperature at the same rate of about 10° C./min to obtain olive pit char. In an embodiment, pyrolyzing an amount of about 800 grams to about 900 grams of alkali-activated olive stone pieces can yield about 100 grams to about 300 grams of alkali-activated olive stone char.

In an embodiment, the alkali-activated olive stone pieces can be wrapped in aluminum foil and placed inside a furnace for pyrolyzing. In an embodiment, the furnace can be programmed to reach a temperature of about 600° C. at about 10° C./min rate. The alkali-activated olive stone pieces can be kept at about 600° C. for about 3 hours, followed by cooling to room temperature at the same rate of about 10° C./min. to obtain the activated olive pit char. The furnace temperature can range from about 200° C. to about 1000° C. In an embodiment, the residence time can range from about 30 minutes to about 5 hours. In an embodiment, the rate of heating can range from about 2° C./min to about 20° C./min. In an embodiment, the rate of cooling can range from about 2° C./min to about 20° C./min.

In an embodiment, the furnace can be a tubular furnace, a muffle furnace, or a hot furnace. In an embodiment, the alkali-activated olive stone pieces can be kept in a crucible without any covering.

In an embodiment, the alkali-activated olive stone pieces char can be acid-activated by immersing the alkali-activated olive stone pieces in a solution including 2N $H_2SO_4$ and stirring overnight, or for about 12 hours to about 24 hours. Then, the acid-activated olive stone char can be removed from the solution by filtering, neutralizing with water, and drying. This step can have a yield of about 70 grams to about 250 grams.

In an embodiment, the polymer solution can be prepared by combining at least one polymer with an organic solvent. In an embodiment, the at least one polymer can include polyethylene and/or ultrahigh molecular weight polyethylene. In one embodiment, ultrahigh molecular weight polyethylene and polyethylene can be mixed with p-xylene to form the polymer solution. Then, the polymer solution can be heated to a temperature ranging from about 120° C. to about 140° C., or about 130° C., and stirred for about 20 minutes to about 40 minutes, or about 30 minutes, to dissolve the polymer and obtain a clear solution.

In an embodiment, the acid-activated olive stone char can be dispersed in the polymer solution to provide a mixture. This dispersion can occur, for example over about 10 to about 20 minutes, or about 15 minutes. Then, the organic solvent can be extracted from the mixture to provide a polymer-olive stone char composite. The yield in this step can range from about 45 grams to about 51 grams.

The polymer-olive stone char composite can be annealed to obtain a dried, porous, adsorbent. In an embodiment, the polymer-olive stone char composite can be heated to a temperature ranging from about 110° C. to about 140° C., or about 130° C., for a period of time ranging from about 2 minutes to about 1 hour, e.g., at a temperature of about 130° C. for about 25 minutes. The polymer-olive stone char composite can be heated in a hot air oven to provide the porous adsorbent.

After annealing, a porous, activated carbon adsorbent can be produced in a single block, e.g., a cylindrical-shaped block, The block can be cut into small flakes having sizes ranging from about 3 mm to about 30 mm. The flakes or porous activated carbon adsorbent flakes can have a high adsorption capacity and a large surface area. In an embodiment, the adsorption capacity of the adsorbent flakes can range from about 225 mg/g to about 275 mg/g, or about 250 mg/g.

In another embodiment, the present subject matter is directed to a method of removing dyes from an aqueous solution, comprising contacting the aqueous solution with the activated carbon adsorbent flakes. In an embodiment, the aqueous solution can include wastewater.

In an embodiment, the adsorbent flakes can be contacted with the aqueous solution by dispersing the adsorbent flakes into the aqueous solution. Once contacted with the aqueous solution, the adsorbent flakes can adsorb dye and other pollutants in the aqueous solution. After use, the adsorbent flakes can be removed from the aqueous solution by any suitable means, e.g., by collecting with a net or other suitable tool. As the adsorbent flakes are large and less dense than water, they can float on the surface of water. As such, the adsorbent flakes can be collected easily after use, without requiring use of a filtration unit.

After collecting the used adsorbent flakes, the dyes can be desorbed from the adsorbent flakes so that the adsorbent flakes may be reused. In an embodiment, the dyes can be desorbed from the adsorbent flakes in alcohol solution. The dyes can be desorbed with high efficiency. In an embodiment, the adsorbent flakes can be reused after desorbing the dyes therefrom.

In an additional embodiment, the adsorbent flakes described herein can be used to remove cations, anions, and/or heavy metal ions from a liquid, for example, from wastewater.

The following examples illustrate the present teachings.

EXAMPLES

Example 1

Preparation of Adsorbent

The process of conversion of olive stones to a porous adsorbent with sufficient strength and a large surface area was conducted using the following steps:

Collection of the olive stone: 1 kg of olive stones were collected and washed with water to remove any pulp impurities.

Drying of the olive stone: The washed olive stones were cut into small pieces by mechanical cutting and followed by drying. The drying was carried out under the sun, where it was kept for two days. The drying can also be done in a hot air oven kept at 110° C. for 1-2 hours. The yield in this step ranges between 800-900 grams.

Alkali-Activation of the olive stones: The dried olive stone pieces were dipped in 2N KOH solution and stirred overnight. Then the olive stone pieces were filtered and neutralized with water and dried under shade. The yield in this step ranges between 800-900 grams.

Pyrolysis: The pieces were wrapped in an aluminum foil and placed inside the tubular furnace. Then tubular furnace was programmed to reach 600° C. at 10° C./min rate. The residence time was kept at 600° C. for 3 hours, followed by cooling to room temperature at the same rate of 10° C./min. Thus, we obtain activated olive stone char. The yield in this step ranges between 100-300 grams.

Acid-Activation of the olive stones: The activated and pyrolyzed olive stone pieces were dipped in 2N $H_2SO_4$ solution and stirred overnight. Then the olive pit pieces were filtered and neutralized with water and dried under shade. The yield in this step ranges between 70-250 grams.

Dissolution of polyethylene: 1 g of polyethylene and 1 g of ultrahigh molecular weight polyethylene was taken in a round-bottomed flask and 100 ml of p-xylene was added to it. Then the solution was heated to 130° C. and stirred for 30 minutes to dissolve the polymer.

Dispersion of activated olive stone char: After obtaining a clear solution, the activated olive stone char (49 g) was dispersed in the polymer solution for 15 minutes. Then the dispersed solution was poured into a cylindrical beaker whose height was more than its diameter. Then the solvent was extracted either by keeping it inside the hood or by applying a vacuum to obtain a dried porous adsorbent with less or no strength. The yield in this step ranges between 45-51 grams.

Annealing: The beaker with the polymer-olive stone char composite was subjected to annealing to 130° C. or up to the melting point of the polymer for 25 minutes inside the hot air oven or 2-5 minutes on the Heidolph hot plate. and the activated olive stone char-polymer composite adsorbent was removed from the beaker and cut into small flakes to obtain a porous adsorbent with sufficient strength and a large surface area. The yield in this step ranges between 45-51 grams.

Example 2

SEM Image of Olive Stone-Based Polyethylene Adsorbent

The olive stone-base polyethylene adsorbent described herein can be seen as shown in the sole FIGURE.

Example 3

Removal of Dye

The adsorbent flakes as described herein were directly placed in polluted water or packed in a non-woven polypropylene fabric and dipped in the polluted water. The porous adsorbent starts adsorbing the dye and reduces the pollutant content inside the water.

It is to be understood that the method for preparing an adsorbent from olive stone char and a polymer is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method for preparing an adsorbent from olive stone and a polymer, comprising:
   obtaining olive stones;
   cutting and drying the olive stones to obtain dried olive stone pieces;
   alkali-activating the dried olive stone pieces to obtain alkali-activated olive stone pieces;
   pyrolyzing the alkali-activated olive stone pieces to obtain alkali-activated olive stone char;
   acid-activating the alkali-activated olive stone char to obtain acid-activated olive stone char;
   dissolving at least one polymer in an organic solvent to obtain a polymer solution;
   dispersing the acid-activated olive stone char in the polymer solution to obtain a mixture;
   extracting the organic solvent from the mixture to obtain a composite; and
   annealing the composite to provide the adsorbent.

2. The method of claim 1, wherein the at least one polymer comprises polyethylene.

3. The method of claim 1, wherein the organic solvent is selected from the group consisting of p-xylene, o-xylene, m-xylene, an isomeric mixture of xylenes, p-cymene, o-cymene, m-cymene, limonene, toluene, mesitylene, other aromatic hydrocarbons, and mixtures thereof.

4. The method of claim 3, wherein the organic solvent is p-xylene.

5. The method of claim 1, further comprising cutting the adsorbent to provide adsorbent flakes.

6. The method of claim 5, wherein the adsorbent flakes have sizes ranging from about 3 mm to about 30 mm.

7. The method of claim 1, wherein the olive stones are dried for about two days under the sun or for about 1 to about 2 hours at a temperature of about 110° C.

8. The method of claim 1, wherein the dried olive stone pieces are alkali-activated by immersing the dried olive stone pieces in a solution including 2N KOH.

9. The method of claim 1, wherein the alkali-activated olive stone pieces are pyrolyzed at a temperature ranging from about 200° C. to about 1000° C. at a residence time ranging from about 30 minutes to about 5 hours.

10. The method of claim 1, wherein the alkali-activated olive stone char is acid-activated by immersing the alkali-activated olive stone char in a solution including 2N $H_2SO_4$.

11. The method of claim 1, wherein dissolving the polymer in the organic solvent comprises:
    heating the organic solvent containing the polymer to a temperature ranging from about 120° C. to about 140° C.; and
    stirring the organic solvent containing the polymer for about 20 minutes to about 40 minutes.

12. The method of claim 1, wherein the annealing comprises heating of the composite at a temperature ranging from about 110° C. to about 140° C. for a period of time ranging from about 2 minutes to about 1 hour.

13. A method of removing a pollutant from an aqueous solution, comprising contacting the adsorbent as prepared in claim 1 with the aqueous solution.

14. The method of claim 13, wherein the aqueous solution comprises wastewater.

15. The method of claim 13, wherein the pollutant comprises organic dyes.

16. The method of claim 15, wherein the organic dyes are selected from the group consisting of Rhodamine B, Alizarin red, Indigo carmine, and a mixture thereof.

17. The method of claim 5, wherein the adsorbent flakes have an adsorption capacity of about 225 mg/g to about 275 mg/g.

* * * * *